(12) United States Patent
Freijy et al.

(10) Patent No.: US 10,011,196 B2
(45) Date of Patent: Jul. 3, 2018

(54) VEHICLE SEAT LATCHING MECHANISM

(71) Applicant: Lear Corporation, Southfield, MI (US)

(72) Inventors: Nizar Freijy, Oxford, MI (US); Rahul Deshmukh, Maharastra (IN); Jianliang Ma, Shanghai (CN); ShuYing Xia, Shanghai (CN); YiHua Huang, Shanghai (CN); Michael Heinrich Joop Heyer, Hainhausen (DE); Norbert Hertling, Munich (DE); Martin Stanner, Buch am Buchrain (DE); Stephan Purnhagen, Burgsinn (DE)

(73) Assignee: LEAR Corporation, Southfield, MI (US)

( * ) Notice: Subject to any disclaimer, the term of this patent is extended or adjusted under 35 U.S.C. 154(b) by 0 days.

(21) Appl. No.: 15/259,499

(22) Filed: Sep. 8, 2016

(65) Prior Publication Data

US 2016/0375802 A1 Dec. 29, 2016

Related U.S. Application Data

(62) Division of application No. 14/153,642, filed on Jan. 13, 2014, now Pat. No. 9,463,718.

(30) Foreign Application Priority Data

Jan. 11, 2013 (DE) .................. 10 2013 200 292

(51) Int. Cl.
*B60N 2/22* (2006.01)
*B60N 2/20* (2006.01)
*B60N 2/36* (2006.01)

(52) U.S. Cl.
CPC ........... *B60N 2/2222* (2013.01); *B60N 2/206* (2013.01); *B60N 2/366* (2013.01); *B60N 2205/35* (2013.01)

(58) Field of Classification Search
CPC ...... B60N 2/2222; B60N 2/206; B60N 2/366; B60N 2205/35

(Continued)

(56) References Cited

U.S. PATENT DOCUMENTS 5,273,336 A 12/1993 Schubring et al.
5,741,046 A 4/1998 Leuchtmann et al.
(Continued)

FOREIGN PATENT DOCUMENTS

CN 102673430 A 9/2012
DE 3211363 A1 10/1983
(Continued)

OTHER PUBLICATIONS

German Office Action and Machine Translation for corresponding Application No. 10 2013 200 292.0, dated Sep. 2, 2013, 14 pages.

(Continued)

*Primary Examiner* — Milton Nelson, Jr.
(74) *Attorney, Agent, or Firm* — Brooks Kushman P.C.

(57) ABSTRACT

A seat assembly is provided with a seat bottom adapted to mount to a vehicle. The seat assembly further includes a first seat back pivotally attached to the seat bottom defining a recline angle relative to the seat bottom, and a second seat back pivotally attached to the seat bottom proximate to the first seat back defining a recline angle relative to the seat bottom. A pin is pivotally connected to the second seat back, is sized to be received within a latch mechanism on the first seat back, and is operably connected to the second seat back to pivot to a stowed position when the first seat back is pivoted to a recline angle that is less than the second seat back recline angle.

18 Claims, 5 Drawing Sheets

(58) Field of Classification Search
USPC .................................. 297/378.12, 354.12
See application file for complete search history.

(56) References Cited

U.S. PATENT DOCUMENTS

| | | | |
|---|---|---|---|
| 7,344,195 B2 * | 3/2008 | Folkert | ............... B60N 2/206 |
| | | | 297/301.4 |
| 7,494,187 B2 | 2/2009 | Inoue et al. | |
| 7,658,430 B2 | 2/2010 | Zielinski et al. | |
| 7,954,873 B2 | 6/2011 | Abe et al. | |
| 2003/0080601 A1 | 5/2003 | Charras et al. | |
| 2004/0195892 A1 | 10/2004 | Daniels | |
| 2006/0076817 A1 | 4/2006 | Link | |
| 2011/0215627 A1 | 9/2011 | Wieclawski | |

FOREIGN PATENT DOCUMENTS

| | | |
|---|---|---|
| DE | 19522128 A1 | 1/1997 |
| DE | 19701775 A1 | 7/1998 |
| DE | 19735253 C1 | 8/1998 |
| DE | 19846633 C1 | 9/1999 |
| DE | 19839743 A1 | 3/2000 |
| DE | 19940813 A1 | 3/2001 |
| DE | 10030822 A1 | 1/2002 |
| DE | 10056024 A1 | 6/2002 |
| DE | 10055425 C2 | 11/2002 |
| DE | 10159533 A1 | 6/2003 |
| DE | 10214380 C1 | 10/2003 |
| DE | 102005039305 A1 | 3/2007 |
| DE | 102005059108 A1 | 4/2007 |
| DE | 102006005728 A1 | 8/2007 |
| DE | 102007049838 B3 | 4/2009 |
| DE | 10345650 B4 | 1/2010 |
| DE | 102012201153 A1 | 8/2013 |
| EP | 0771690 A2 | 5/1997 |
| EP | 0854063 A2 | 7/1998 |
| EP | 1231102 A1 | 8/2002 |
| EP | 0992393 B1 | 2/2008 |
| JP | S6317137 A | 1/1988 |
| JP | 512263 U | 2/1993 |
| JP | 558453 U | 8/1993 |
| JP | 6211075 A | 8/1994 |
| JP | 2001505840 A | 5/2001 |
| JP | 2001322461 A | 11/2001 |
| JP | 2002248975 A | 9/2002 |
| JP | 2002347488 A | 12/2002 |
| JP | 2003040004 A | 2/2003 |
| JP | 2003070585 A | 3/2003 |
| JP | 2003089370 A | 3/2003 |
| JP | 2003182416 A | 7/2003 |
| JP | 2003206664 A | 7/2003 |
| KR | 1998069306 A | 10/1998 |
| KR | 20000003983 A | 1/2000 |
| KR | 20000053641 A | 8/2000 |
| KR | 20010254268 Y1 | 11/2001 |
| KR | 20020009237 A | 2/2002 |
| KR | 20020032233 A | 5/2002 |
| KR | 20020067651 A | 8/2002 |
| KR | 200291428 Y1 | 10/2002 |
| KR | 20030022050 A | 3/2003 |

OTHER PUBLICATIONS

Chinese Office Action from corresponding Application No. 201410012328.5, dated Sep. 14, 2015, 9 pages.

* cited by examiner

VEHICLE SEAT LATCHING MECHANISM

CROSS-REFERENCE TO RELATED APPLICATIONS

This application is a division of U.S. application Ser. No. 14/153,642 filed Jan. 13, 2014, now U.S. Pat. No. 9,463,718, which, in turn, claims foreign priority benefits under 35 U.S.C. § 119(a)-(d) to DE 10 2013 200 292.0, filed Jan. 11, 2013, the disclosures of which are hereby incorporated in their entirety by reference herein.

TECHNICAL FIELD

Various embodiments of the present invention relate to vehicle seat latching mechanisms.

BACKGROUND

A vehicle seat latch is disclosed in U.S. Patent Application Publication Number 2011/0215627 A1, which published to Wieclawski.

SUMMARY

In at least one embodiment, a seat assembly is provided comprising a seat bottom adapted to mount to a vehicle. The seat assembly further includes a first seat back pivotally attached to the seat bottom defining a recline angle relative to the seat bottom, and a second seat back pivotally attached to the seat bottom proximate to the first seat back defining a recline angle relative to the seat bottom. A pin is pivotally connected to the second seat back, is sized to be received within a latch mechanism on the first seat back, and is operably connected to the second seat back to pivot to a stowed position when the first seat back is pivoted to a recline angle that is less than the second seat back recline angle.

In at least one embodiment, a latching mechanism is provided comprising a releasable catch adapted to mount to a first seat back, and a pin adapted to mount to a second seat back and configured to cooperate with the releasable catch. The latching mechanism also includes a spindle affixed to the first seat back, and a cable disposed on the second seat back having a first end in mechanical connection with the pin, and a second end wrapped about a portion of the spindle, wherein a forward pivoting of the spindle relative to the second seat back unwraps the cable releasing a tensile force in the cable, thereby pivoting the pin to a stowed position.

In at least one embodiment, a seat assembly comprising a seat bottom adapted to mount to a vehicle, a first seat back pivotally attached to the seat bottom defining a recline angle relative to the seat bottom and a second seat back pivotally attached to the seat bottom defining a recline angle relative to the seat bottom. The seat assembly further includes a retractable pin connected to the second seat back and configured to be received within a latch on the first seat back, and an actuator cable operably connected to both the pin and first seat back. A pivoting of the first seat back to a recline angle that is less than the recline angle of the second seat back causes an increase in a tensile force of the cable thereby pivoting the pin to a stowed position.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
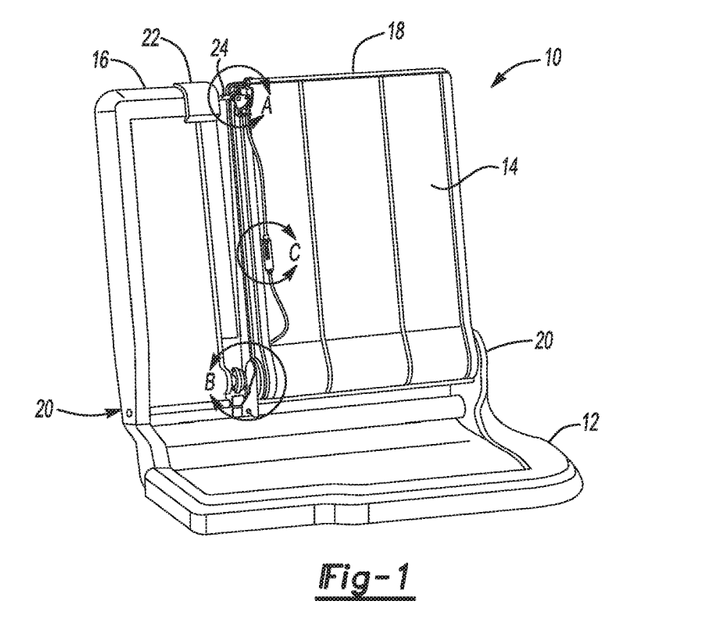
FIG. 1 depicts a seat assembly according to an embodiment with first and second seat backs in upright positions.
Figure 2:
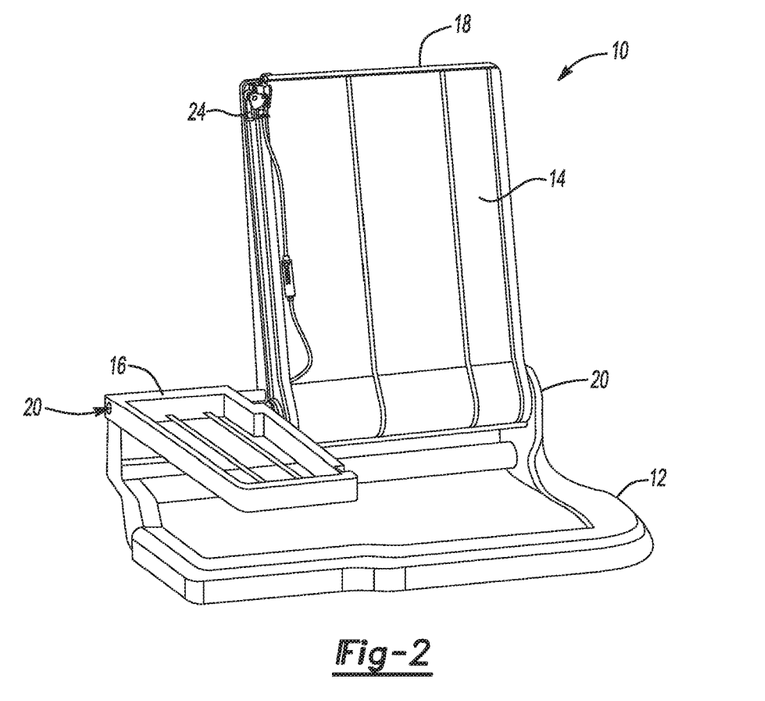
FIG. 2 depicts the seat assembly of FIG. 1, where the first seat back is rotated forward relative to the seat bottom to a stowed position.
Figure 3:
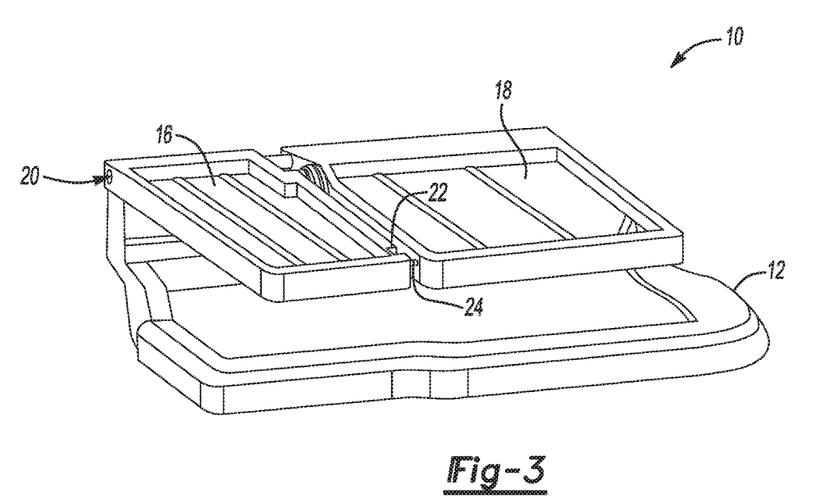
FIG. 3 depicts the seat assembly of FIG. 1, where both of the first and second seat backs are rotated forward relative to the seat bottom to stowed positions.

FIGS. 1 through 3 depict a seat frame assembly 10 having mechanisms attached. Cushion and fabric coverings are not shown in order to illustrate the mechanics of the disclosed embodiments. It should be appreciated that a seat assembly according to the present disclosure would include such items as implemented in a vehicle. The seat assembly 10 includes a seat bottom 12 that is adapted to mount to a vehicle floor. A back portion 14 extends from the seat bottom 12 and is partitioned into a first seat back 16 and a second seat back 18. Each of the first and second seat backs 16, 18 is provided with a hinge 20 and is capable of independently pivoting to a range of seat back recline angles relative to the seat bottom 12. Related to structural integrity of the seat assembly 10 in addition to customer comfort, it may be desirable to mechanically tie the two proximate seat backs together. In at least one embodiment, a latch and pin combination are provided such that the two seat backs 16, 18 may be retained to each other when both seat backs are positioned at substantially the same recline angle. The retention between the seat backs simulates the strength and behavior of a single seat back unit. The first seat back 16 includes a releasable latch 22, and the second seat back 18 is provided with a pin assembly 24 which is sized to be received within the latch 22. It is contemplated that alternative embodiments can have the latch and pin inverted, where the pin assembly 24 is attached to the first seat back 16 and the latch 22 is mounted to the second seat back 18.

As shown in FIG. 2, when the latch 22 is released, the first seat back 16 is capable of pivoting forward about the hinge 20 towards the seat bottom 12 to a stowed position. The second seat back 18 may be left in an upright position. With the second seat back 18 alone remaining upright, deployed pin assemblies of the prior art protrude into an open area and may create the possibility of snagging passenger clothing or cargo. Further, prior art protruding pin assemblies may present challenges to vehicle impact management strategies relative to passenger interaction with the pin. Therefore, in at least one embodiment, the pin 24 is pivotally connected to the second seat back 18 and configured to pivot to a retracted position. The pin assembly 24 is operably connected to the first seat back 16 and is reactive to a separation in recline angles between the first seat back 16 and the second seat back 18. An outer surface (not shown) of the seat assembly 10 may include a recess to receive the retracted pin thereby allowing the pin to rest substantially flush to the outer surface.

Figure 4:
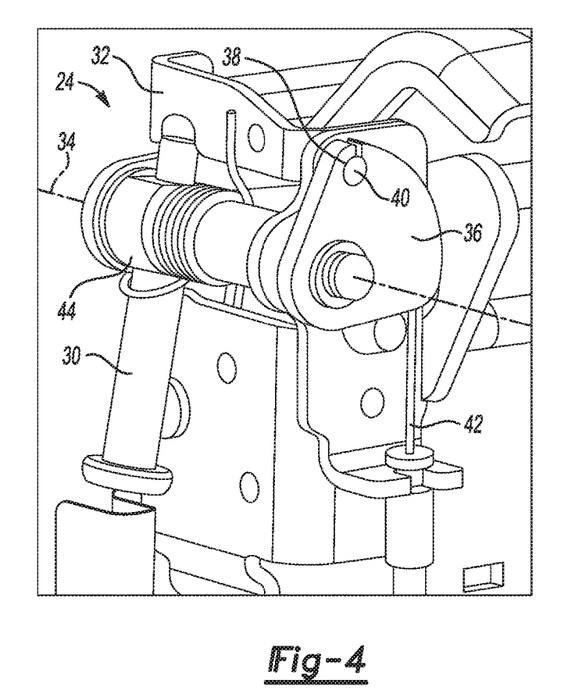
FIG. 4 depicts a pin assembly according to an embodiment, and corresponding to View A in FIG. 1, where the pin is rotated to a retracted position.
Figure 5:
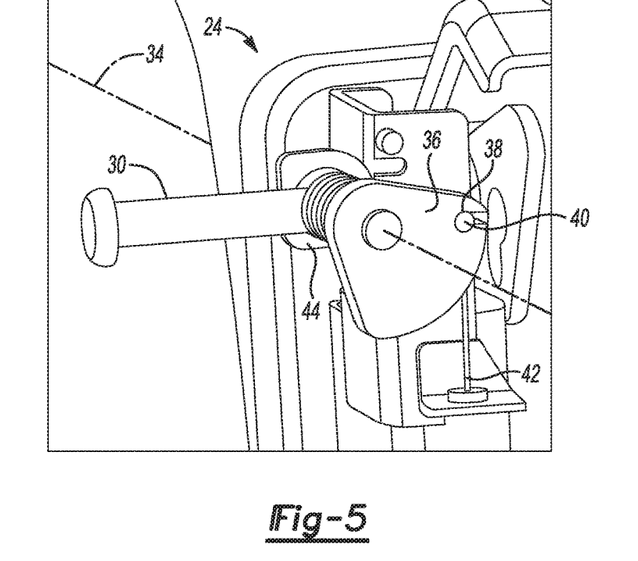
FIG. 5 depicts the pin assembly of FIG. 4, where the pin is rotated to a deployed position.

Referring to FIGS. 4 and 5, View A illustrates a pin assembly generally shown by numeral 24. The pin assembly includes a pivotal pin 30. The pin 30 has a deployed position and a retracted position. The pin 30 is affixed to a pin pivot bracket 32 and is rotatable about a first axis 34. A bell crank 36 is a mechanism for converting linear motion to rotary motion, and is operably connected to one end of the pin. The bell crank 36 includes an opening 38 to receive a barrel end fitting 40 mounted to the end of an actuator cable 42. Alternatively, other types of fixed cable end fittings may be suitable to attach to a bell crank. The bell crank 36 is configured to transfer linear actuation of the cable 42 into rotational actuation of the pin 30. As the actuator cable 42 strokes due to an applied tensile force, the bell crank 36 causes the pin 30 to pivot from a retracted position generally depicted in FIG. 4, to a deployed position generally depicted in FIG. 5.

In at least one embodiment, the pin assembly 24 includes a return spring 44 configured to bias the pin 30 towards the retracted position. When a predetermined tensile force from the cable 42 is applied to the bell crank 36 and is sufficient to overcome the bias, the pin 30 is held in a deployed position. However, when the tensile force in the cable 42 is reduced to less than a predetermined amount, the return spring 44 becomes dominant, and the pin 30 is biased toward the retracted position. The cable 42 is under a greater tensile load when the pin 30 is deployed compared to when the pin 30 is retracted. Therefore, one advantage of the present embodiment is that in the case of a cable failure where tensile force is diminished, the pin 30 can automatically move to the retracted position and will not protrude if the seat backs are separated.

Figure 6:
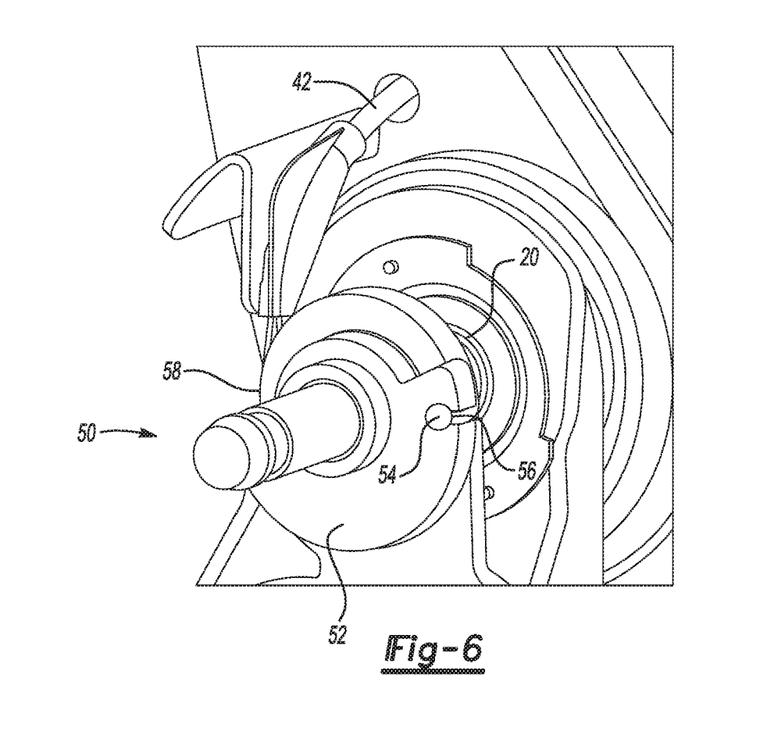
FIG. 6 depicts a lower spindle according to an embodiment, and corresponding to View B in FIG. 1.

Referring to FIG. 6, View B depicts a lower spindle assembly generally indicated by reference numeral 50. The spindle assembly 50 is affixed to the first seat back 16 near the hinge 20. The actuator cable 42 extends from the opening 38 of the bell crank 36 as described above, down to a lower spindle 52. The spindle 52 also has an opening 54 to receive a second barrel fitting 56 on an opposing end of the actuator cable 42. Further, the actuator cable 42 is wrapped around a portion 58 of the body of the lower spindle 52. As the first seat back 16 is pivoted, the lower spindle 56 rotates correspondingly to the movement of the first seat back 16. Therefore, when the first seat back 16 is pivoted to a recline angle more forward than the recline angle of second seat back 18, the cable 42 is unwrapped from the spindle 52 thereby reducing tensile force in the actuator cable 42. The reduction of the tensile force allows actuation of the pin 30 towards the retracted position referred to above in reference to FIGS. 4 and 5.

Figure 7:
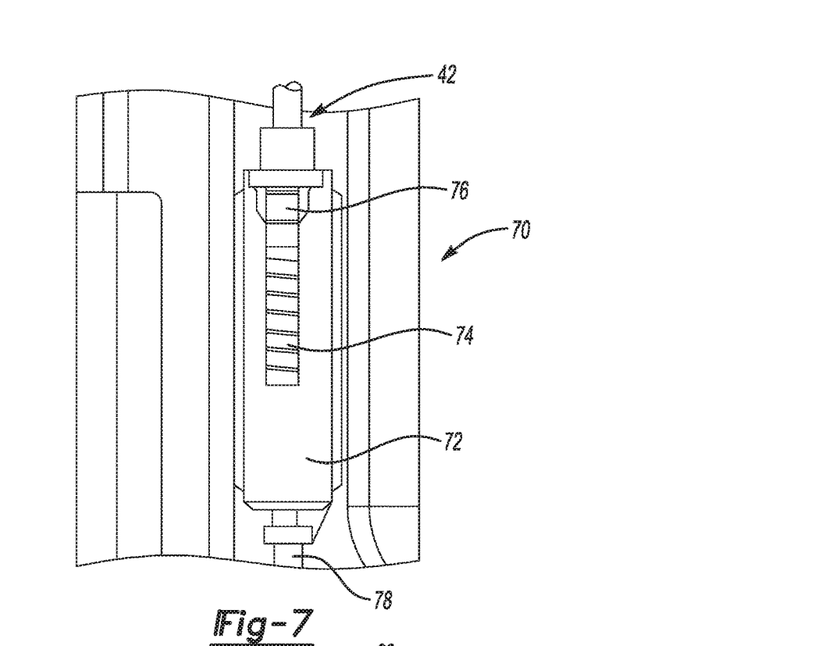
FIG. 7 depicts a compensator spring according to an embodiment, and corresponding to View C in FIG. 1.

As shown in FIG. 7, View C illustrates a compensation device 70 disposed near a middle portion the actuator cable 42. The device comprises a housing 72 which houses a compensation spring 74. In at least one embodiment, the compensation spring 74 is a coil spring. A first end of the compensation spring 74 is related to an upper portion 76 of the actuator cable 42, and an opposing second end of the compensation spring 74 is related to a lower portion 78 of the actuator cable 42. The compensation spring 74 is configured to take up any additional slack that may be created in the cable 42 when tensile force is reduced from an unwrapping of the lower spindle 52. When the tensile force is released, the compensation spring 74 can, in response, expand, thereby removing excess length in the cable 42. Under conditions where the actuator cable 42 is under an increased tensile load, the compensation spring 74 is compressed, allowing for some limitation of maximum tensile load within the cable 42.

If the second seat back 18 is pivoted forward relative to the seat bottom 12 while the first seat back 16 is already pivoted forward, the cable 42 is re-wrapped about the lower spindle 52 increasing tensile force in the cable 42. The increased force causes the pin 30 to re-extend to the deployed position as the second seat back 18 rotates forward. As the recline angle of the two seats converges to substantially the same position, the pin 30 is further rotated to the deployed position to be received by the latch 22. FIG. 3 shows both the first back 16 and the second seat back 18 rotated forward. In this configuration, the seat backs are reattached to each other by the insertion of the pin 30 into the latch 22.

Figure 8:
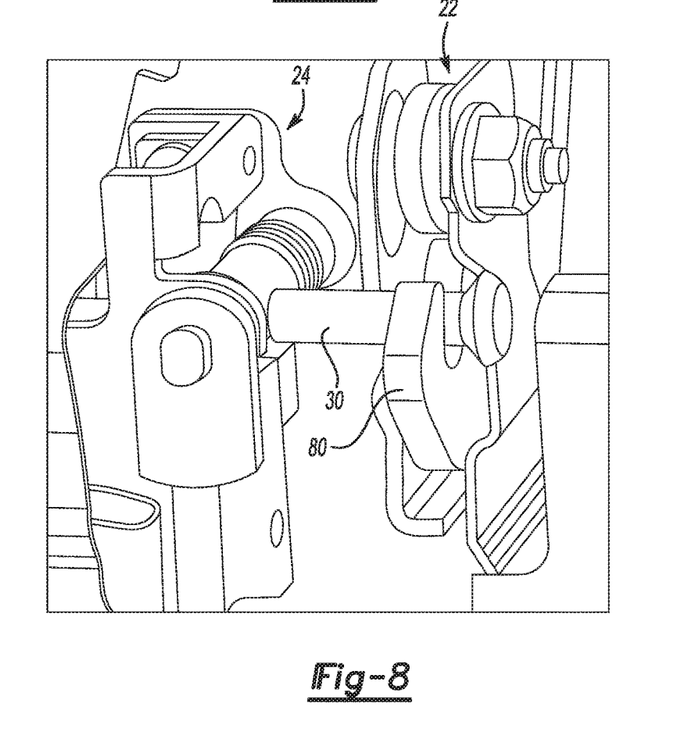
FIG. 8 depicts the deployed pin engaged in a latch according to an embodiment.

FIG. 8 depicts the pin 30 inserted into, and retained by, a releasable catch portion 80 of the latch 22. The pin is inserted into the latch 22 when the first back 16 and second seat back 18 are positioned at substantially the same recline angle relative to the seat bottom 12. The latch 22 opening is configured to face in a rear direction relative to vehicle orientation. In this way, the latch 22 and pin assembly 24 are less visible from forward passenger seating positions when both the first and second seat backs are in the upright recline angles. This configuration enhances the aesthetic suitability by substantially hiding the mechanics of the latching system.

A lower torsion spring (not shown) is operatively attached to the hinge portion 20 of the first seat back. The lower torsion spring biases the first seat back 16 toward the stowed position. Therefore, in the case of a cable 42 failure, the pin 30 is automatically actuated to the retracted position, and the first seat back 16 is also biased to the stowed position. The configuration of the present embodiment operates to provide an indication to a vehicle operator that the mechanism requires service repair.

It should be appreciated that a reverse configuration is contemplated wherein the return spring of the pin assembly is configured to bias the pin to pivot in the opposite direction towards the deployed position. In this alternative embodiment, tensile force applied to the cable actuates a bell crank, but the rotational force to the pin is in the direction towards the retracted position. In this case the cable is under a higher tensile force when the pin is retracted, as compared to when the pin is deployed. One advantage of this alternative embodiment is that the cable is under increased tension only during the configuration when the first seat back is folded forward and the second seat back remains upright. Therefore this configuration may serve to reduce the load duty cycle of the actuator cable.

Figure 9:
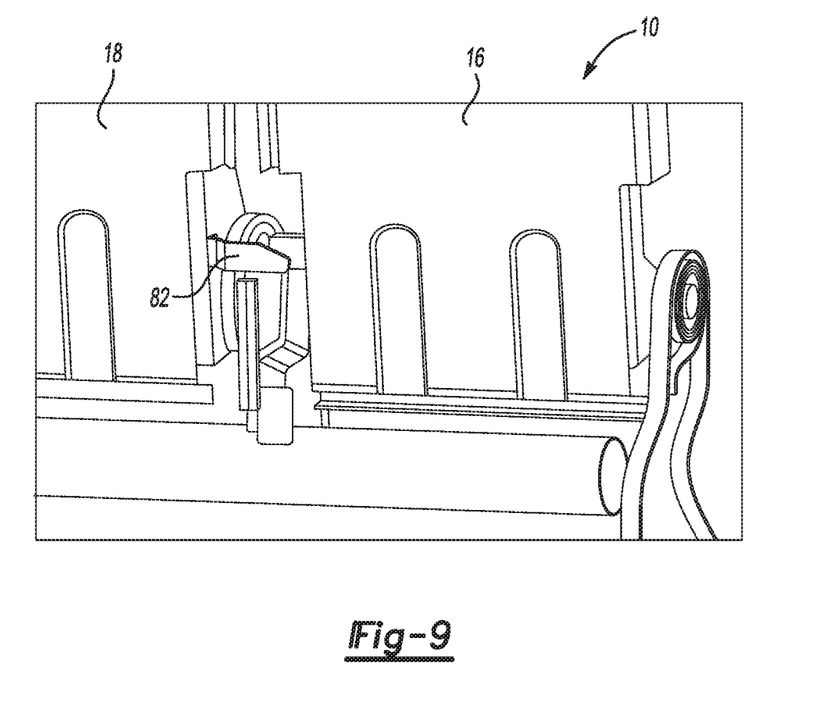
FIG. 9 depicts a stop mechanism according to an embodiment disposed on a rear portion of the seat assembly of FIG. 1.

FIG. 9 depicts a rear perspective view of the seat assembly. The assembly is further provided with a stop mechanism 82 extending from either the first seat back 16 or the second seat back 18. The stop mechanism 82 protrudes towards the other of the first or second seat back. Therefore the stop mechanism 82 can serve as a limit to prevent the first seat back 16 from pivoting to a recline angle that is rearward of the second seat back 18. The stop mechanism 82 prevents an error state crash condition where the pin is deployed on the side of the first seat back 16 opposite of the latch opening.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A seat assembly comprising:
   a seat bottom adapted to mount to a vehicle;
   a first seat back pivotally attached to the seat bottom defining a recline angle relative to the seat bottom;
   a second seat back pivotally attached to the seat bottom proximate to the first seat back defining a recline angle relative to the seat bottom;
   a pin pivotally connected to the second seat back sized to be received within a latch mechanism on the first seat back, and operably connected to the second seat back to pivot to a stowed position when the first seat back is pivoted to a recline angle that is less than the second seat back recline angle; and
   a return spring configured to bias the pin to the stowed position.

2. The seat assembly of claim 1 further comprising an actuator cable mechanically connected to the first seat back such that pivoting the first seat back forward of the second seat back reduces a tensile force in the actuator cable thereby pivoting the pin into the stowed position.

3. The seat assembly of claim 2 wherein the tensile force in the actuator cable increases thereby rotating the pin to a deployed position when either the first or second seat back is pivoted to a recline angle substantially the same as the other of the first or second seat back.

4. The seat assembly of claim 2 further comprising a compensator spring disposed in a middle portion of the actuator cable to take up slack in the actuator cable when tension is released.

5. The seat assembly of claim 1 further comprising a lower torsion spring to bias the first seat back forward.

6. The seat assembly of claim 1 wherein the latch mechanism defines an opening capable of receiving the pin, and the opening is disposed on a rear facing surface of the first seat back.

7. The seat assembly of claim 1 wherein one of the first and the second seat backs provides a limit to prevent the first seat back from pivoting to a recline angle more rearward than the recline angle of the second seat back.

8. The seat assembly of claim 1 further comprising the latch mechanism, the latch mechanism comprising:
   a releasable catch mounted to the first seat back to cooperate with the pin;
   a spindle affixed to the first seat back; and
   a cable disposed on the second seat back having a first end in mechanical connection with the pin, and a second end wrapped about a portion of the spindle, wherein a forward pivoting of the spindle relative to the second seat back unwraps the cable releasing a tensile force in the cable, thereby pivoting the pin to a stowed position.

9. The seat assembly of claim 8 anther comprising a bell crank operably connected to the pin to transfer tensile force in the cable into a rotational force to pivot the pin towards a deployed position.

10. The seat assembly of claim 8 wherein a rotation of either of the first or second seat back to a recline angle substantially the same as the other of the first or second seat back causes a tensile force increase in the cable and thereby moves the pin to a deployed position.

11. The seat assembly of claim 8 wherein the return spring is operably connected to the pin, to bias the pin to pivot towards the stowed position.

12. The seat assembly of claim 8 further comprising a compensator spring disposed in a middle portion of the cable to expand and take up an excess length in the cable when tensile force is released from the cable.

13. A seat assembly comprising:
    a seat bottom adapted to mount to a vehicle;
    a first seat back pivotally attached to the seat bottom defining a recline angle relative to the seat bottom;
    a second seat back pivotally attached to the seat bottom defining a recline angle relative to the seat bottom;
    a retractable pin connected to the second seat back to be received within a latch on the first seat back;
    an actuator cable operably connected to both the pin and first seat back; and
    a compensator spring disposed in a middle portion of the actuator cable to take up slack in the actuator cable when a tensile force of the actuator cable is reduced,
    wherein a pivoting of the first seat back to a recline angle that is less than the recline angle of the second seat back causes an increase in the tensile force of the actuator cable thereby pivoting the pin to a stowed position.

14. The seat assembly of claim 13 wherein the latch defines an opening to receive the retractable pin and the opening is disposed on a rear facing portion of the first seat back.

15. The seat assembly of claim 13 further comprising a spindle attached to the first seat back wherein the actuator cable wraps a portion of the spindle.

16. The seat assembly of claim 13 wherein pivoting either the first seat back or the second seat back to substantially the same recline angle as the other of the first seat back or the second seat back causes a reduction in the tensile force of the actuator cable thereby pivoting the pin to a deployed position.

17. The seat assembly of claim 13 further comprising a return spring connected to the retractable pin to bias the pin to a deployed position.

18. A seat assembly comprising:
    a seat bottom adapted to mount to a vehicle;
    a first seat back pivotally attached to the seat bottom defining a recline angle relative to the seat bottom;
    a second seat back pivotally attached to the seat bottom proximate to the first seat back defining a recline angle relative to the seat bottom;
    a pin pivotally connected to the second seat back sized to be received within a latch mechanism on the first seat back, and operably connected to the second seat back to pivot to a stowed position when the first seat back is pivoted to a recline angle that is less than the second seat back recline angle;
    an actuator cable mechanically connected to the first seat back such that pivoting the first seat back forward of the second seat back reduces a tensile force in the actuator cable thereby pivoting the pin into the stowed position; and a compensator spring disposed in a middle portion of the actuator cable to take up slack in the actuator cable when tension is released.

* * * * *

UNITED STATES PATENT AND TRADEMARK OFFICE
CERTIFICATE OF CORRECTION

PATENT NO. : 10,011,196 B2
APPLICATION NO. : 15/259499
DATED : July 3, 2018
INVENTOR(S) : Nizar Freijy et al.

Page 1 of 1

It is certified that error appears in the above-identified patent and that said Letters Patent is hereby corrected as shown below:

In the Claims

Column 6, Line 1, Claim 9:
After "The seat assembly of claim 8"
Delete "anther" and
Insert -- further --.

Signed and Sealed this
Fourth Day of December, 2018

Andrei Iancu
*Director of the United States Patent and Trademark Office*